Figure 6:
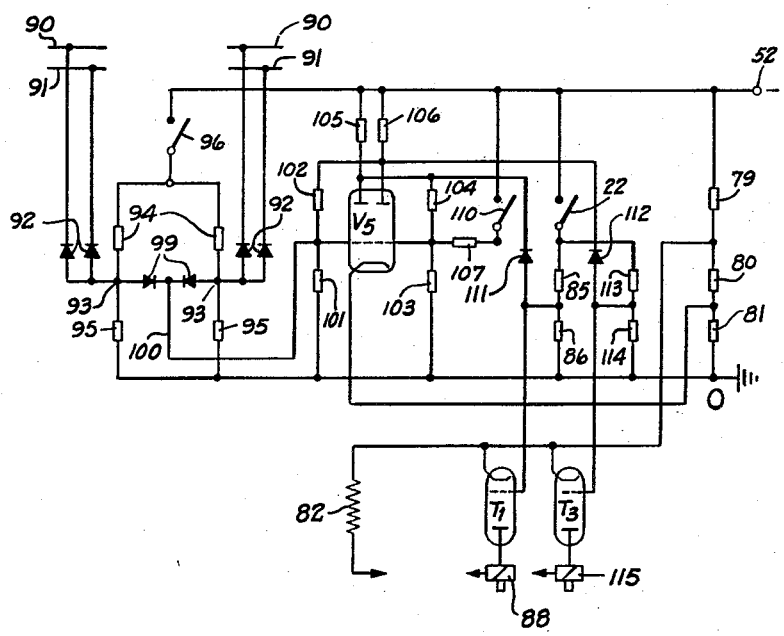

July 10, 1962  R. PUDELKO ET AL  3,043,501
DEVICE FOR TRANSFERRING MEASUREMENTS RECORDED
BY PRINTED CODE SYMBOLS TO PUNCHED CARDS
Filed Feb. 3, 1960  4 Sheets-Sheet 1
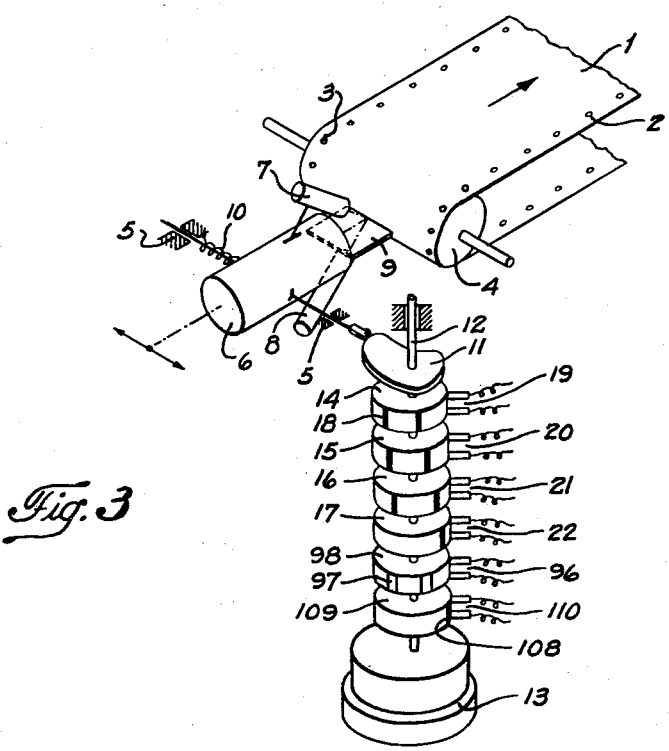
INVENTORS:
RICHARD PUDELKO
ERNST HUBER
FRANZ KILCHMANN
BY
Morgan, Finnegan, Durham & Pine
ATTORNEYS.

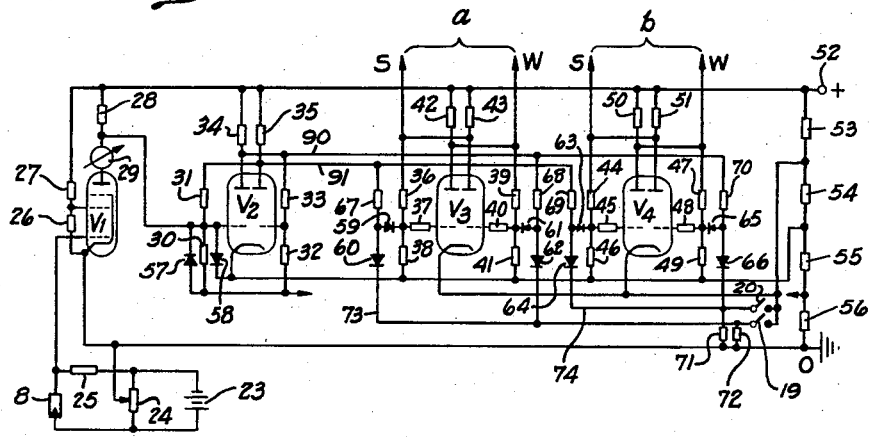

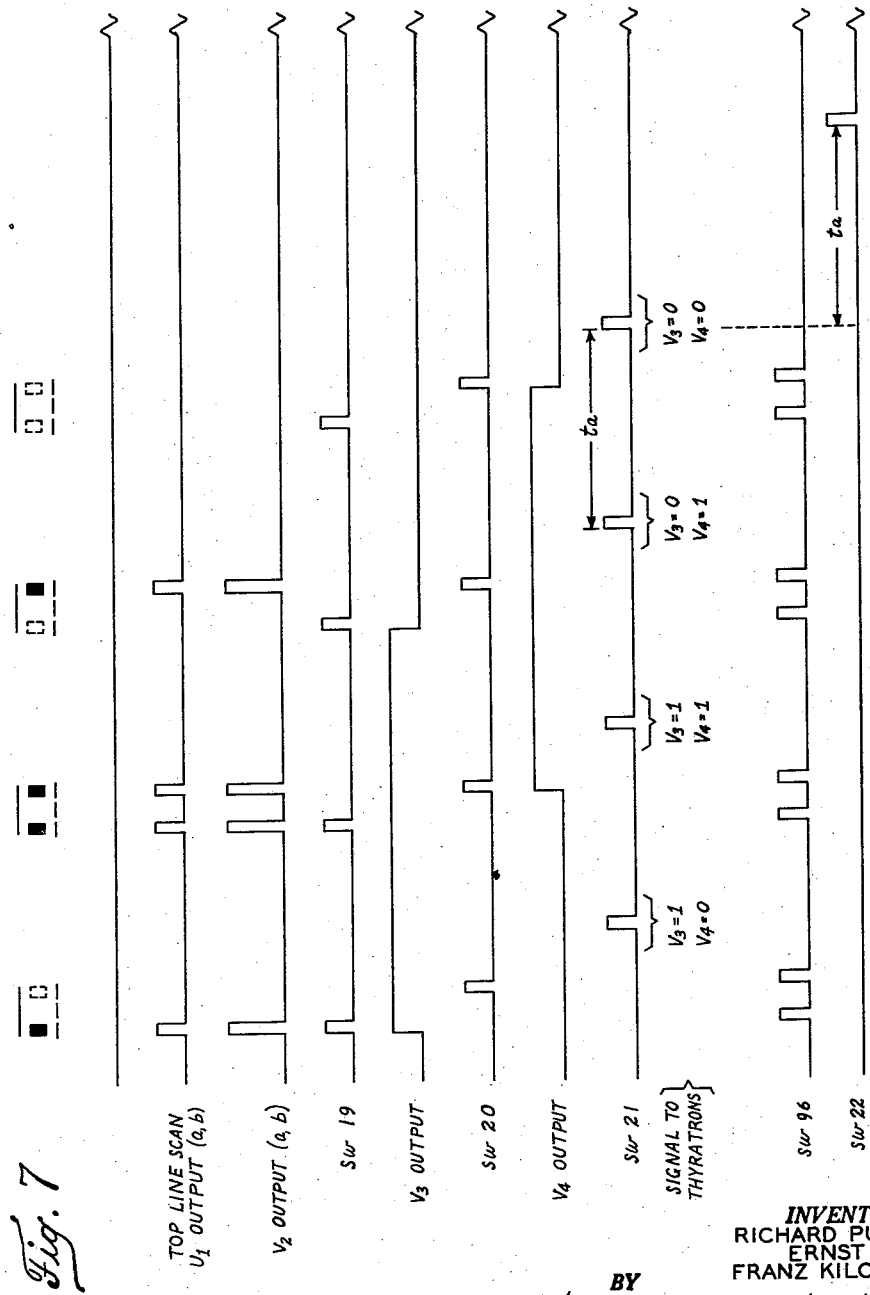

United States Patent Office 3,043,501
Patented July 10, 1962

3,043,501
DEVICE FOR TRANSFERRING MEASUREMENTS RECORDED BY PRINTED CODE SYMBOLS TO PUNCHED CARDS
Richard Pudelko, Zug, Ernst Huber, Baar, Zug, and Franz Kilchmann, Oberwil, Zug, Switzerland, assignors to Landis & Gyr, A.G., Zug, Switzerland, a body corporate of Switzerland
Filed Feb. 3, 1960, Ser. No. 6,556
Claims priority, application Switzerland Feb. 25, 1959
4 Claims. (Cl. 234—55)

The invention relates to a device for transferring recorded measurements, which are represented by coded printed symbols, preferably those which originate from electricity meters provided with a printing recorder, to means which can be utilized in calculating or punched-card machines, for the purpose of processing for accounting, statistics, etc.

For the accurate and rational use of readings, particularly those of electricity meters, if the analysis is to be effected in the known punched-card machine, the numerical values printed in figures on recording strips must be transferred by hand to punched cards, which takes up a great deal of time and is very expensive and still requires special checking means in order to remove any errors which may have arisen during the transfer.

So-called perforated-strip recording instruments are already known wherein the recording of the measurements is effected by means of perforation marks punched one behind the other. Such perforated recording strips are processed in special analyzing equipment. Since with this type of recording, the speed of advance of the recording strip is included in the result of the measurement, and the measurement of the spacing of the perforation marks is a source of error, the results are too inaccurate for certain purposes such as calculating charges. It is true that recording devices are also presently known wherein the measurements are recorded in the form of coded perforations which can be analyzed directly. The associated analyzing equipment is, however, very complicated in construction. In addition, such recordings have the disadvantage that a direct reading of the numerical values from the recording strips is rendered difficult. With printed code symbols, this disadvantage can easily be overcome as a result of the fact that the printing mechanism also prints the corresponding value in figures simultaneously with the code symbols. So far, however, a suitable device for the mechanical transfer of such measurements represented by printed code symbols to punched cards which can be analyzed in punched-card machines, has been lacking.

It is thus an object of the invention to provide means for translating data represented by printed code symbols into corresponding data symbolized in accordance with the requirements of data processing machines.

Another object of the invention is to provide such means in which there is included a self-checking feature.

Another object of the invention is to provide such translating means which functions to convert the data from one form to another in a rapid and automatic fashion.

A still further object of the invention is to provide such a translating means which has a minimum number of differing components so that the problems of parts procurement, maintenance and the like are mitigated.

An additional object of the invention is to provide a translating means of the character described which rapidly, automatically and reliably translate data in printed form to corresponding data in perforated form such as is recorded on punched cards.

These and other objects and advantages of the invention will be set forth in part hereinafter and in part will be obvious herefrom, or may be learned by practice with the invention, the same being realized and attained by means of the instrumentalities and combinations pointed out in the appended claims.

The present invention relates to a device for transferring measurements which are recorded by printed code symbols, preferably those from electricity meters, to punched cards or strips, which is characterized in that it consists of optical reading means scanning the printed code symbols, storage means associated therewith through amplifiers, a common decoding section, an output section which is actuated through this and which comprises a plunger acting on the keyboard of a punched-card machine, a checking section for supervising the reading operation and a synchronizing device which controls the operation of the device depending on the movement of the reading means.

The invention consists in the novel parts, constructions, arrangements, combinations and improvements herein shown and described.

One embodiment of the subject of the invention is illustrated diagrammatically by way of example in the drawings, of which:

FIGURE 1 shows the code symbols used;
FIGURE 2 shows a part of a recording strip provided with measurements;
FIGURE 3 shows a mechanical part of the device;
FIGURES 4 and 5 show an electrical circuit;
FIGURE 6 shows an electrical circuit of a checking section which supervises the operation of the device; and
FIGURE 7 comprises a schematic diagram illustrating the sequence of operation of various stages in the system.

In FIGURE 1, each digit 0 to 9 has allocated to it a code symbol which consists of one or two rectangular fields which are arranged differently in the four corners of a larger rectangle. The four possible positions of the fields are designated by $a$ to $d$. Hereinafter the positions $a$, $b$ and $c$, $d$ are referred to as lines and the positions $a$, $c$ and $b$, $d$ as columns. FIGURE 2 shows a part of a recording strip printed with such code symbols. The recording of the code symbols described may be effected by means of a known printing mechanism wherein a hammer presses a recording strip at regular intervals of time against the raised code symbols of a counting mechanism with the interposition of an ink ribbon. A known double counting mechanism may also be used to advantage, the one counting mechanism being equipped with code symbols and the other with digits. The recording strip illustrated in FIGURE 2 originates from such a double counting mechanism.

In FIGURE 3, a recording strip 1 which is provided with code symbols as shown in FIGURES 1 and 2, is unrolled over a roller 4 which is provided with pins 3 corresponding to the perforations 2. An optical reading head, which consists of a light source 6, two photo-electric cells 7, 8 and a partition 9 mounted between these, and which is displaceable in guides 5, is directed onto the part of the recording strip 1 which is provided with printed code symbols. The optical reading head 6 to 9 is subject to the action of a spring 10 and is moved by a cam-plate 11 which is secured to a shaft 12 which is driven by a motor 13. During its movement, the photoelectric cell 7 scans the upper line of the printed code symbol and the photoelectric cell 8 scans the lower line of the code symbol. Secured to the shaft 12 which, with the associated parts forms a synchronizing device, are contact rollers 14 to 17 and 98, 109 which, with their contact bridges 18, 97, 108 close switches 19 to 22, 96, 110.

In FIGURE 4, which shows a part of the circuit of the device according to the invention, the photoelectric cell 8 is connected through a bridge circuit formed by a source of direct current 23, a potentiometer 24 and a resistor 25, to the control grid of a tube V1. With the aid of the resistors 26, 27 and the load resistor 28, the tube V1 is connected as a linear amplifier and is provided with an ammeter 29 inserted in the anode line. The anode of the tube V1 is connected to the grid of a duo-triode V2. The duo-triode V2 is connected, by means of the resistors 30 to 35, as a bistable multivibrator and forms a non-linear amplifier. The anodes of V2 are connected to the grids of two further duo-triodes V3, V4 which form pulse storage means and which are likewise connected as bistable multivibrators with the aid of the resistors 36 to 43 and 44 to 51. The supply lines 0 and 52 serve as a source of current with a voltage divider formed by resistors 53 to 56. The rectifiers 57, 58 which are connected to the grid of the tube V2 keep the voltage of this grid within the limits determined by the points of connection to the voltage divider. The rectifiers 59 to 66, which are connected to the grids of the tubes V3 and V4, form, together with the resistors 67 to 70 and 71, 72, gate circuits which only permit a response of the tubes V3 and V4 when voltage is applied to the control lines 74, 73 through the switches 19, 20 of the synchronizing device shown already in FIGURE 3.

The photoelectric cell 7 is likewise provided with such a circuit comprising the tubes V1 to V4 as is illustrated in FIGURE 4. The conductors $s$, $w$ leading from the anodes of the dual tubes V3, V4 are allocated to the individual code-symbol positions $a$, $b$, $c$, $d$ and are designated accordingly.

The decoding and output section of the device is illustrated in FIGURE 5. The conductors $s$, $w$ leading the anodes of the duo-triodes V3, V4 and allocated to the code-symbol positions $a$, $b$, $c$, $d$ are represented in the form of horizontal bus bars to which are connected the ten gate circuits corresponding to the selected code, each of which consists of four rectifiers 75 and a voltage divider formed by resistors 76, 77. Through these gate circuits, on closing of the switch 21, positive pulses are conveyed from the voltage source 0, 52 through a voltage divider formed by the resistors 79 to 81, to the grids of thyratrons T. The thyratrons are supplied with power through a transformer winding 82 and each includes an electromagnet 83 in its anode conductor. The electromagnets 83, only two of which are illustrated for the sake of simplicity, actuate, when they are energized, plungers 84 which press on the keyboard of a punched-card machine. In the present case, ten thyratrons are provided, the grids of which are connected respectively to the plurality of gate circuits 75 to 77 and the electromagnets of which actuate the digit keys 0 to 9. Further thyratrons T1 and T2 are connected with their grids through voltage dividers 85, 86 by means of switches 22 and 87 respectively to a higher voltage and serve to actuate the punched-card feed key or the card-changing key of the punched-card machine by means of electromagnets 88 and 89 on closing of the switch 22 or 87 respectively.

If the optical reading head is conveyed past the code symbols on the recording strip 1 by the camplate 11, the anode currents allocated to the two tubes V1 vary according to whether light or dark areas appear in front of the photoelectric cells 7, 8. As a result, the dual tubes V2 in the circuits associated with the two photoelectric cells, are brought into the one stable condition or the other, one of the anodes of a tube V2 always having a high and the other a low voltage. If the photoelectric cells 7, 8 are directed towards the first column of a digit represented by the code symbol, the contact roller 14 closes its switch 19 for a moment, as a result of which the bias of the control lines 73 of the tubes V3 is raised in such a manner that the tubes V2 cause the tubes V3 to change over. The latter remain in the changed condition even when the switch 19 is opened. If the photoelectric cells 7, 8 are directed towards the second column, the contact 20 is closed and the process is repeated with the tubes V2, V4.

The scanning of the following digits is effected in the same manner as described above. As a result, the voltages which appear at the conductors $s$, $w$ of the decoding section illustrated in FIGURE 5 have a value which corresponds to the code symbol just read. If the contact roller 16 of the switch 21 is now closed, the grid voltage is raised only at those thyratrons wherein all the rectifiers 75 of the associated gate circuit are at the higher anode voltages of the tubes V3, V4. Thus only one thyratron ever ignites at a time, namely that which corresponds to the code symbol read. As a result, its electromagnet 83 is energized and the associated plunger 84 actuates a key of the punched-card machine.

The procedure is repeated with the next code symbol. After the last code symbol in a number, the switch 22 is closed and the electromagnet which actuates the feed key is energized by the appropriate thyratron T1. Thus the punched card is prepared to receive the next number by means of the electromagnet 83. At the same time, the roller 4 is turned by means of a mechanism which is not illustrated until the next coded number comes within the field of view of the reading head.

After a certain number of transferred numbers, the switch 87 is closed through a mechanism which is not illustrated and leads, through the thyratron T2 and its electromagnet 89, to the actuation of a device which causes the card change.

In summary the following actions occur in timed sequence with respect to each photosensitive circuit and its associated amplifying, storing, checking and decoding circuits. The sequence will be described in terms of scanning of the upper row $a$, $b$ of each frame, it being understood that scanning of the lower row occurs simultaneously:

(1) As the photocell 7 scans the upper part, $a$, of the column $a$, $c$, the respective switch 19 in effect connects the associated multivibrator $v_2$ to storage stage $v_3$.

(2) As the photocell scans the upper part $b$ of the second column $b$, $d$, the respective switch 21 becomes operative and in effect transfers the multivibrator $v_2$ to storage stage $v_4$. Thus, the area, $a$, in each group is assigned to stage $v_3$ while the area $b$ is assigned to stage $v_4$. (In like manner the stage $v_3$ associated with photocell 8 is allocated to area $c$ while the stage $v_4$ operated from photocell 8 is allocated from area $d$.)

(3) After both columns of a code group representing one character are thus scanned, switch 21 activates the decoder section, thus initiating the punching operation which in effect transfers the character to the punched card or type, provided a checking operation described more fully hereinafter indicates correct performance. After all the characters in one scanning cycle have been thus transferred, the switch 22 is activated to initiate a card feeding operation whereby the card is positioned to receive new data, e.g. a new numeral quantity.

(4) After a predetermined number of data have been thus transferred, the switch 87 is actuated, thus initiating a card change cycle in which a new card is delivered into operative position to receive data.

The sequences described above are graphically and schematically illustrated in FIGURE 7. As seen in that figure, the output of $v_1$ controlled by upper photocell 7 is in effect amplified in $v_2$. During the scanning of area, $a$, in each frame, switch 19 is closed. If a dark element is detected during this interval, one plate of $v_3$ experiences a rise in voltage. Whenever a dark spot is absent from area $a$, this plate voltage drops. During those intervals when the $b$ area is scanned, switch 20 is closed, thus connecting $v_4$ to amplifier $v_2$. When a dark spot is missing from area $b$, one plate of $v_4$ will have a low voltage while the presence of a dark spot during the $b$ interval causes this plate voltage to rise.

After one frame has been scanned, the output stored in tubes $v_3$ and $v_4$ are sensed by virtue of the operation of switch 21. As illustrated in the drawings, $v_3$ is high (symbolized as "1") and $v_4$ is low (symbolized as "0") as the result of scanning the first frame. Scanning of the second frame produces the condition $v_3=1$ and $v_4=1$. Scanning of the third frame produces $v_3=0$ and $v_4=1$. Scanning of the fourth frame produces $v_3=0$ and $v_4=0$. A similar action characterizes the functioning of tubes $v_3$ and $v_4$ which are associated with the scanning of the lower row $c$ and $d$ by photocell 8. As noted more fully hereinafter, the action of switch 96 depicted in FIGURE 7, serves to control a checking operation which is initiated as each column is scanned.

The ammeters 29 which are present in the anode conductors of the tubes V1, serve, together with the potentiometers 24, to adjust the limits between light and dark.

FIGURE 6 illustrates the electrical circuit of a checking section which supervises the operation of the device according to the invention.

The junctions 93 of two voltage dividers, which are formed by resistors 94, 95, are connected through rectifiers 92 to the conductors 90, 91 leading from the anodes of the two tubes V2 (see FIGURE 4). In the common supply line for the two voltage dividers is the switch 96 which is closed by the contact bridges 97 of a contact roller 98 of the synchronizing device (FIGURE 3). The two junctions 93 of the voltage dividers 94, 95 which, together with the rectifiers 92 form gate circuits, are connected through rectifiers 99 and a common conductor 100 to the grid of a dual tube V5 which is connected as a bistable multivibrator by means of the resistors 101 to 106. The second grid of the tube V5 is connected through a resistor 107 and a switch 110, which can be closed by the contact bridge 108 of contact roller 109 (FIGURE 3), to the supply line 52 of the source of current. The anode of the system of the tube V5, the grid of which is connected to the conductor 100, is connected through rectifier 111 to the grid of the thyratron T1. The second anode of the tube V5 is connected through a rectifier 112 to the grid of another thyratron T3 which is connected at the same time to the junction of a voltage divider which is formed by the resistors 113, 114 and which is connected between the switch 22 and the supply conductor 0 of the source of current. The thyratron T3 actuates a checking electromagnet 115 which acts with its plunger on a checking key of the punched-card machine, namely on the one which, after a plurality of marks have been advanced simultaneously effects the punching of a check perforation.

The contact bridges 97 on the contact roller 98 are arranged in such a manner that the switch 96 is always briefly closed at the end of each of the closing times of the switches 19 and 20. Thus a positive pulse is supplied to the two voltage dividers 94, 95. If, at this moment, both of the multivibrators formed by the dual tubes V2 are in a definite condition, one of the conductors 90, 91 always has a high and the other a low voltage. In this case, the positive pulse from the switch 96 is conveyed away through one of the rectifiers 92 and the particular conductor 90 or 91 which is carrying the low voltage. If, however, the color contrast of a code symbol is such that the photoelectric cell 8 does not clearly distinguish light or dark, the multivibrator V2 in question is not in a definite condition at the moment when the switch 96 closes, that is to say, the higher voltage is lower and the lower voltage is higher than it should be in the conductors 90, 91. In such a case, the positive pulse from the switch 96 is not carried away and, by means of the corresponding voltage dividers 94, 95 and the rectifiers 99, the voltage of the conductor 100 and of the grid of the tube V5 which is connected thereto is raised, as a result of which the voltage at the anode connected to the resistor 105 drops with a changeover action and at the same time the voltage of the second anode rises.

After the four digits of a number have been read and transferred, the switch 22 is closed in the manner already described above, in order to effect a card feed. In the circuit shown in FIGURE 6, however, the cold-cathode tube T1 and hence the electromagnet 88 is only actuated when the voltage at the anode connected to the resistor 105 is high, that is to say when all the readings were satisfactory. If the voltage at this anode is low, then the voltage at the second anode, which is connected to the resistor 106, is high. As a result of the closing of the switch 22, the tube T3 is actuated, not the tube T1, because the rectifier 111 of the tube T1 conveys away the positive pulse whereas the rectifier 112 of the tube T3 does not because the latter is at a higher voltage. The plunger of the electromagnet 115 actuates the appropriate key on the punched-card machine which causes not only the card feed but also a check perforation. After this operation, the second grid of the tube V5 briefly receives a higher voltage through the switch 110, as a result of which the bistable multivibrator formed by this tube is again brought into the original condition.

As a result of the check perforation associated with the card feed, all those numbers are thus distinguished in which the reading was not satisfactory and which may therefore be wrong. These must be re-checked.

With the electromagnet 88 connected to the thyratron T3 and the electromagnet 115 connected to the thyratron T1, the checking of the punched cards may also be carried out in such a manner that a check perforation is made when the measurements are punched correctly. This has the advantage that the faulty cards can be found more easily.

The device described may conveniently be provided with a counting mechanism which stops the device if the number of check perforations exceeds a certain predetermined number during a transfer operation. As a result, attention is drawn in good time to the faultiness of a recording strip and a waste of punched cards is avoided.

The invention in its broader aspects is not limited to the specific mechanisms shown and described but departures may be made therefrom within the scope of the accompanying claims without departing from the principles of the invention and without sacrificing its chief advantages.

What is claimed is:

1. Data translating systems for transferring data in punched form, represented by binary type light and dark elements arranged in subdivisions of each of a plurality of fields, to media punched according to said data comprising photoresponsive means for discriminating said light and dark elements, scanning means for displacing said photoresponsive means relative to said data in printed form for scanning the same, a plurality of bistable electronic storage means responsive to the output of said photoresponsive means, first gating means synchronized with said scanning means for selectively activating said storage means in accordance with the subdivision which is being scanned whereby each of said storage means is allocated to a particular subdivision and is in one or the other of said stable states according to whether said subdivision contains a light or dark element, decoding means comprising a plurality of decoder circuits connected to said plurality of bistable storage means, each of said decoder circuits being responsive to a particular combination of said states of said storage means, second gating means synchronized with said scanning means for activating said decoding means subsequent to the scanning of a field whereby one of said decoder circuits depending on said combination of states is energized, and a plurality of punching means responsive respectively to said decoder circuits, one of said punching means being energized when the respective decoder circuit is energized thereby translating said data in printed form to data in punched form.

2. A system according to claim 1 in which said subdivisions comprise rows and columns and in which there are a plurality of said photoresponsive means, each being operatively disposed for scanning a respective row.

3. A system according to claim 1 in which said photoresponsive means are coupled to said storage means via bistable amplifier means, said amplifier means having states depending on whether said light or dark elements are being scanned, and in which means comprising check gating means and bistable checking means are provided, said bistable checking means being coupled to said bistable amplifier means to detect the operation thereof by way of, and when, said check gating means are activated, said check gating means being activated by switching means synchronized with said scanning means for providing said detection as each of said subdivisions is scanned, and means synchronously activated with respect to said scanning means after a plurality of said detecting operations and responsive to said bistable checking means for providing an indication of whether said scanning function as manifested in the operation of said bistable amplifier means, is operating properly.

4. A system according to claim 3 in which said scanning means, said first and second gating means, said switching means and said indicating means are actuated from a common motive means.

References Cited in the file of this patent

UNITED STATES PATENTS 2,224,763    Dickinson et al. _____ Dec. 10, 1940